US010864955B2

(12) United States Patent
Eberlberger

(10) Patent No.: US 10,864,955 B2
(45) Date of Patent: Dec. 15, 2020

(54) TELESCOPIC SEAT POST

(71) Applicant: LUPAAN GMBH, Linz (AT)

(72) Inventor: Lukas Eberlberger, Enns (AT)

(73) Assignee: LUPAAN GMBH, Linz (AT)

( * ) Notice: Subject to any disclaimer, the term of this patent is extended or adjusted under 35 U.S.C. 154(b) by 31 days.

(21) Appl. No.: 16/209,062

(22) Filed: Dec. 4, 2018

(65) Prior Publication Data

US 2019/0106171 A1 Apr. 11, 2019

Related U.S. Application Data

(63) Continuation of application No. PCT/AT2017/060109, filed on Apr. 27, 2017.

(30) Foreign Application Priority Data

Jun. 6, 2016 (AT) .............................. A 50513/2016

(51) Int. Cl.
*B62J 1/06* (2006.01)
*B62J 1/00* (2006.01)
(Continued)

(52) U.S. Cl.
CPC .... *B62J 1/06* (2013.01); *B62J 1/00* (2013.01); *B62J 1/08* (2013.01); *B62K 19/36* (2013.01); *B62J 2001/085* (2013.01)

(58) Field of Classification Search
CPC ......... B62J 1/00; B62J 1/06; B62J 1/08; B62J 2001/085; B62K 19/36
(Continued)

(56) References Cited

U.S. PATENT DOCUMENTS 5,044,648 A * 9/1991 Knapp ..................... B62J 1/06
188/322.17
6,220,581 B1 4/2001 Mueller
(Continued)

FOREIGN PATENT DOCUMENTS

CN 204368374 6/2015
EP 1 927 538 6/2008
(Continued)

OTHER PUBLICATIONS

International Search Report dated Jul. 31, 2017 in International (PCT) Application No. PCT/AT2017/060109.
(Continued)

*Primary Examiner* — Jacob D Knutson
*Assistant Examiner* — Felicia L. Brittman
(74) *Attorney, Agent, or Firm* — Wenderoth, Lind & Ponack, L.L.P.

(57) ABSTRACT

A telescopic seat post, in particular for fastening in a seat tube (SR) of a bicycle (FR), includes: —a tubularly configured telescopic element with a longitudinal axis (LA) and a cavity extending along the longitudinal axis (LA), —a piston rod extending along the longitudinal axis (LA) in the cavity of the telescopic element, —a force accumulator connected to the piston rod for moving the piston rod in the direction of the longitudinal axis (LA), wherein an intermediate element is provided which is displaceable along the piston rod and along the telescopic segment in the direction of the longitudinal axis (LA) and is fastenable releasably to the piston rod in various positions along the longitudinal axis (LA) and, irrespective of the position on the piston rod, is fastenable releasably in various positions along the longitudinal axis (LA) of the telescopic segment.

16 Claims, 8 Drawing Sheets

(51) Int. Cl.
  *B62J 1/08*   (2006.01)
  *B62K 19/36*  (2006.01)
(58) Field of Classification Search
  USPC .......................................................... 280/274
  See application file for complete search history.

(56) References Cited

U.S. PATENT DOCUMENTS

| | | |
|---|---|---|
| 8,024,992 B2 | 9/2011 | Morelli |
| 2008/0127770 A1 | 6/2008 | Morelli |
| 2011/0257848 A1 | 10/2011 | Shirai |
| 2014/0208933 A1* | 7/2014 | Kuo ........................... B62J 1/08 |
| | | 91/43 |
| 2016/0304146 A1* | 10/2016 | Teixeira ..................... B62J 1/06 |
| 2017/0274949 A1* | 9/2017 | Pittens .................... B62K 19/36 |

FOREIGN PATENT DOCUMENTS

| | | |
|---|---|---|
| EP | 2 284 068 | 2/2011 |
| EP | 2 574 799 | 4/2013 |
| FR | 2 779 406 | 12/1999 |
| FR | 2 952 031 | 5/2011 |
| WO | 93/23281 | 11/1993 |

OTHER PUBLICATIONS

Search Report dated Apr. 12, 2017 in Austrian Application No. A 50513/2016, with English translation.

* cited by examiner

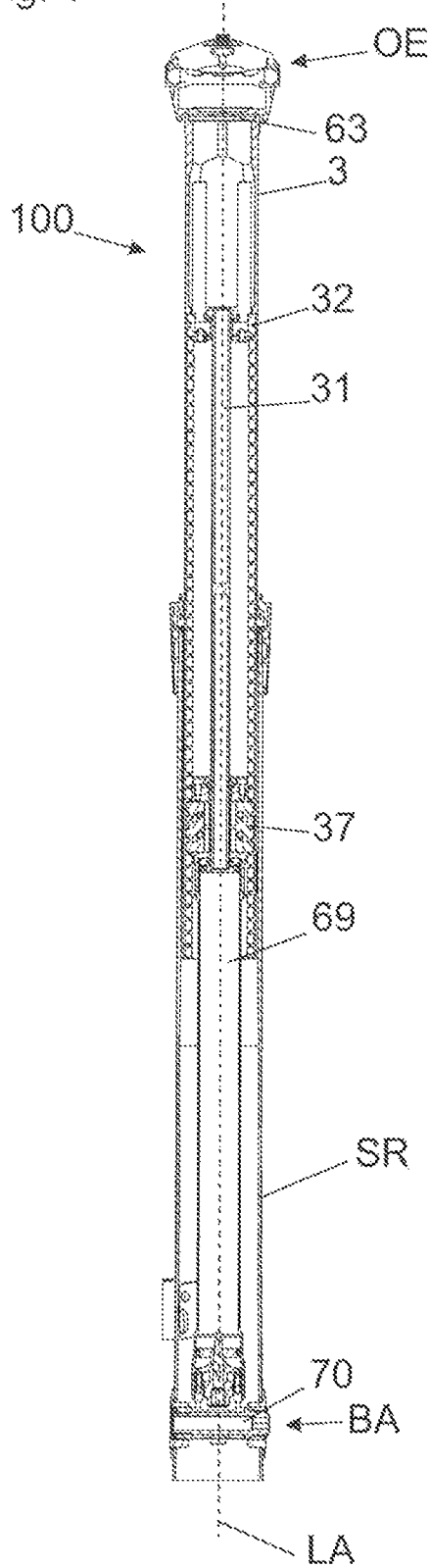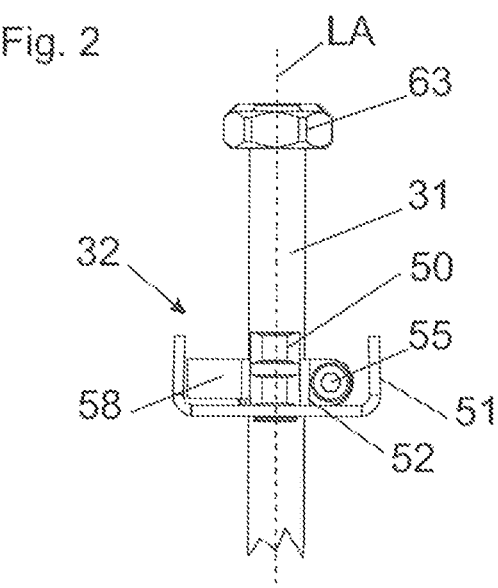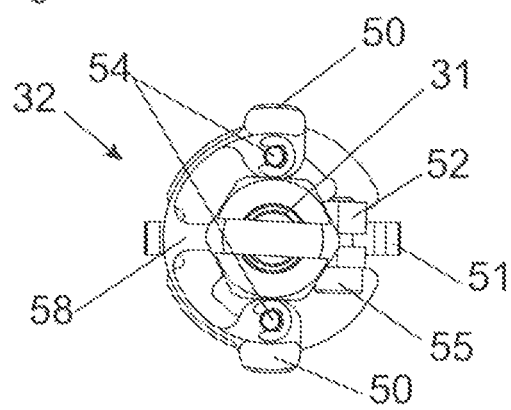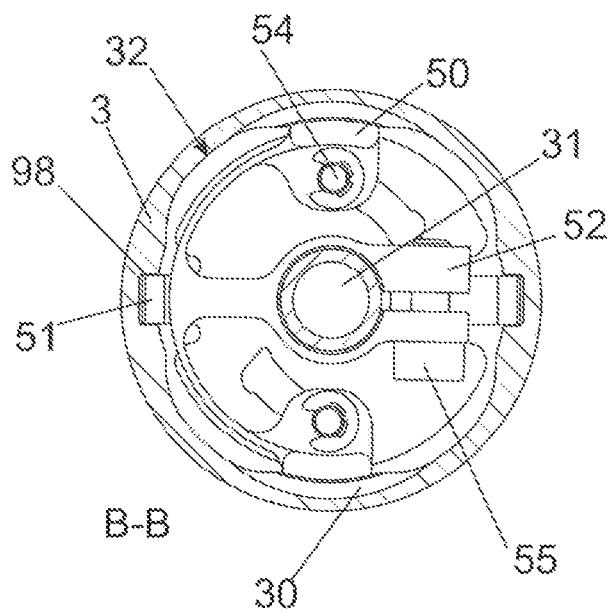

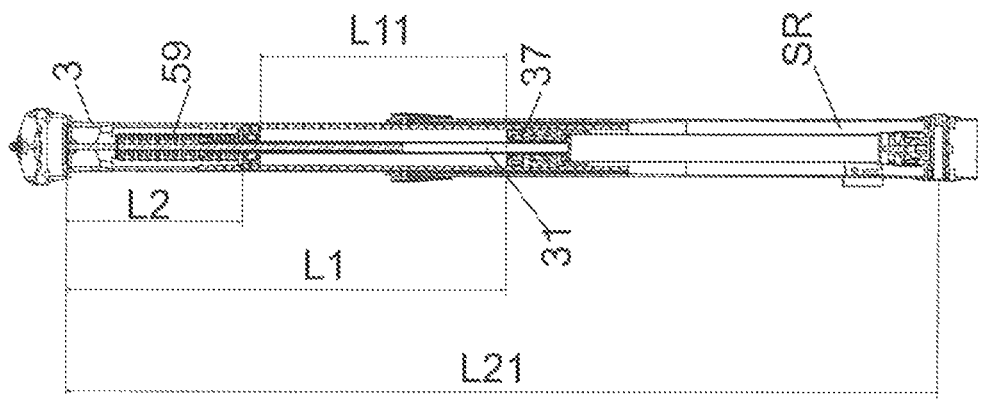
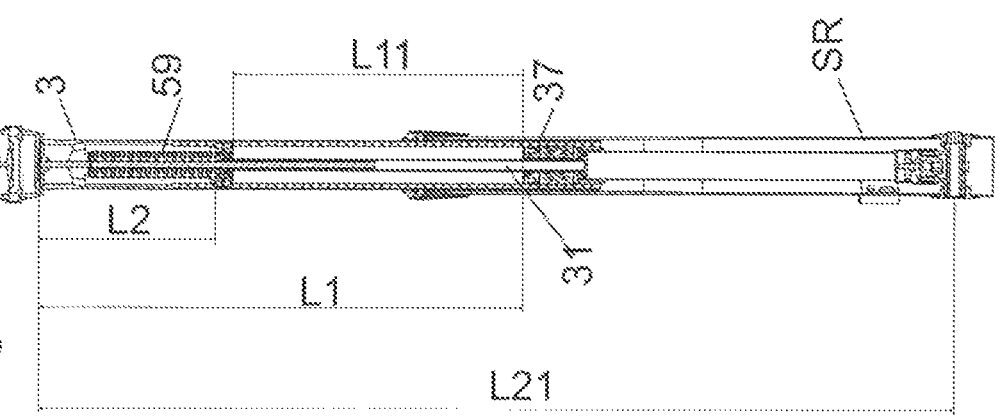
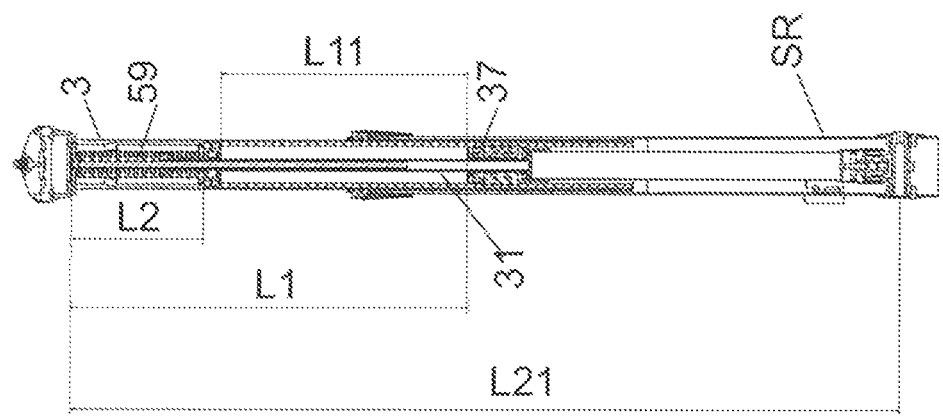
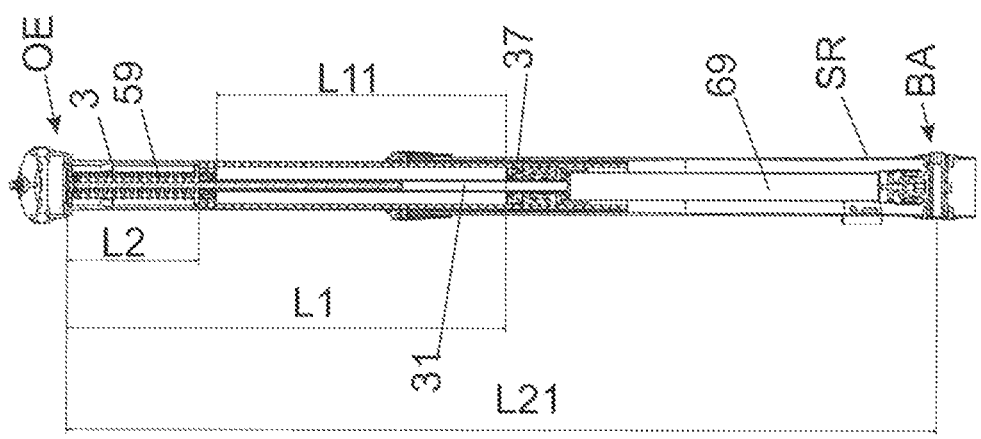

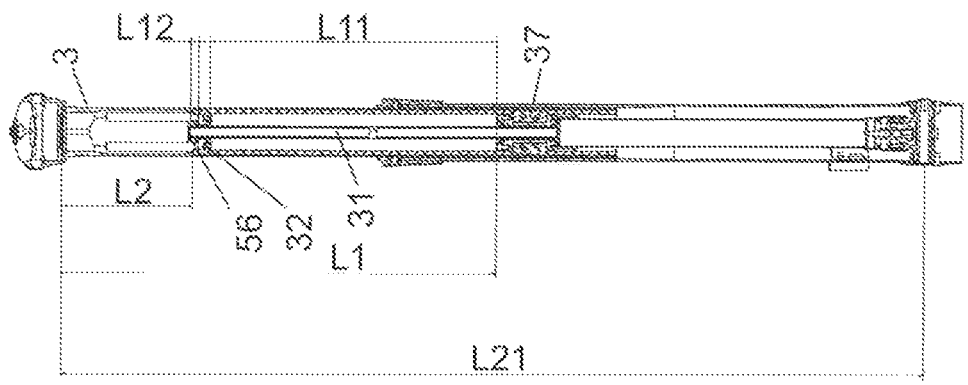
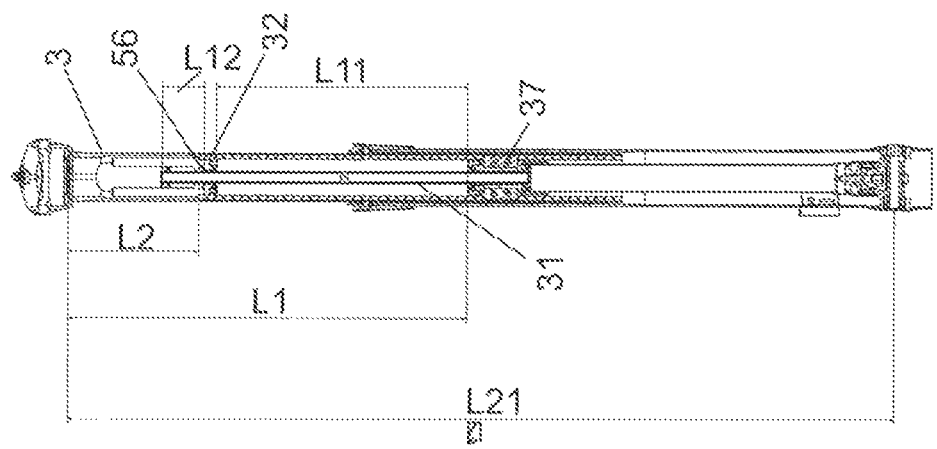
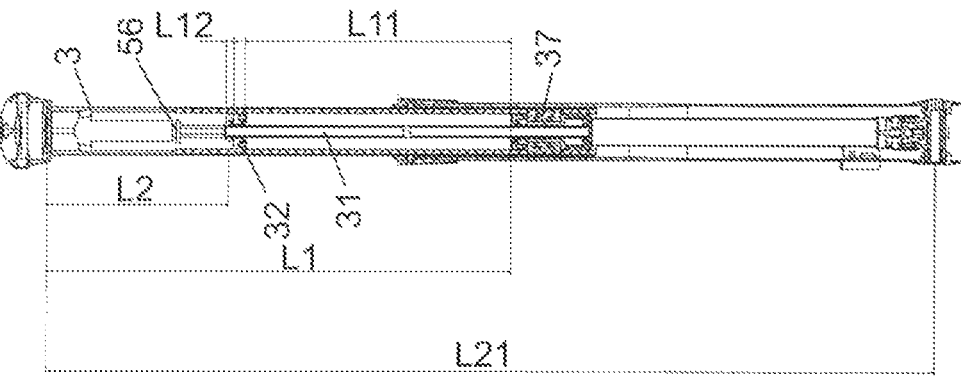
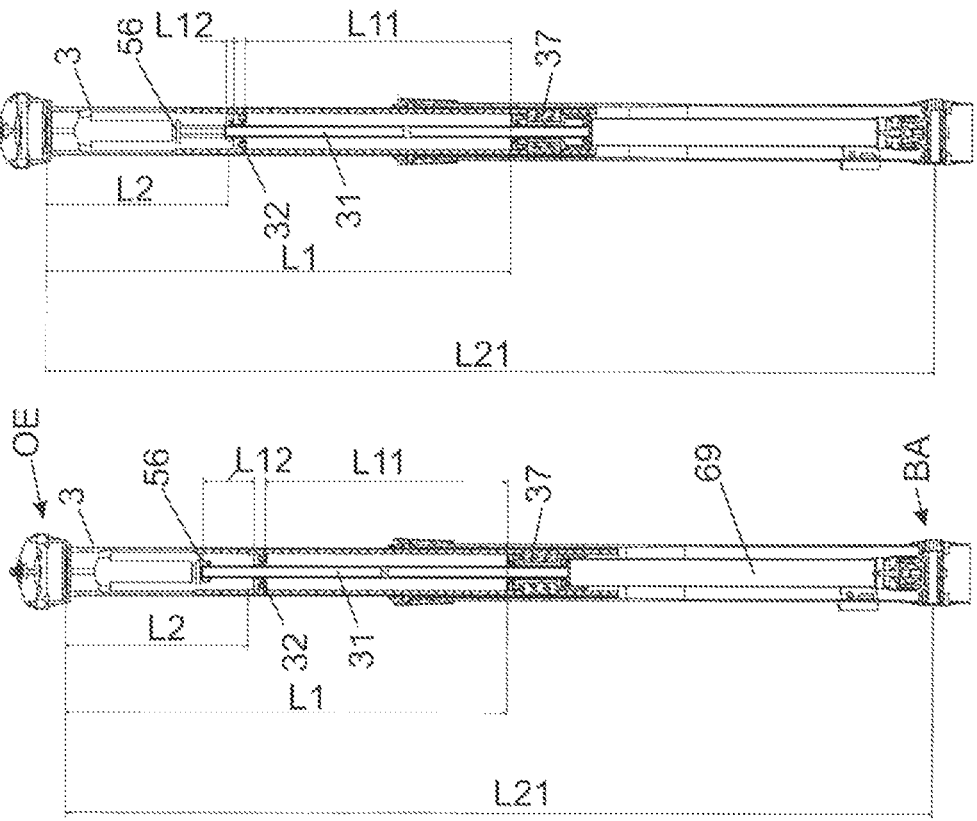

TELESCOPIC SEAT POST

BACKGROUND OF THE INVENTION

The invention relates to a telescopic seat post, in particular for fastening in a seat tube of a bicycle, and to a bicycle with a telescopic seat post according to the invention.

Telescopic seat posts already belong to the state of the art and are shown, for example, in EP 2284068 A2. With seat posts which are shown by the state of the art, the base setting of these seat posts and the adaptation to the size of the bicycle rider are problematical. Anatomical differences between bicycle riders mean that the seat post has to be adjusted. Differences, such as e.g. the body size or also the inside leg measurement of the bicycle rider, make it necessary to use not only a corresponding bicycle frame with the suitable dimensions, but also a suitably dimensioned seat post. In addition, it is necessary to adapt the base setting of the seat post depending on the field of use and type of the bicycle. One of the essential problems with the integration of a variable telescopic seat post in a bicycle frame is the setting of the upper and lowest seat position. If the seat post cannot be adjusted correspondingly, losses with respect to performance, comfort and efficiency of a bicycle rider must be anticipated. In addition, the risk of injury increases enormously if a bicycle is incorrectly adapted in terms of the geometry. Although it is possible to be able to raise or lower the seat correspondingly during riding with variable, telescopic seat posts, this is usually effected in a limited form and adjustment range predefined in terms of design by the seat post. The system travel of the seat post is often not variably predefined. If such setting possibilities for the base setting should be provided, these settings cannot be made without a high outlay on the seat post. For this, a person skilled in the art or a mechanic is needed to make these settings. In some cases, design changes to the telescopic seat post are also necessary. In order to be able to cover different body sizes, different telescopic seat posts of the same type are also produced, the length and/or adjustment range of which are different.

SUMMARY OF THE INVENTION

The object of the invention is to avoid the above-described disadvantages and to specify a telescopic seat post that is improved compared with the state of the art, and a bicycle that is improved compared with the state of the art with a telescopic seat post according to the invention.

If an intermediate element, displaceable along the piston rod and along the telescopic segment in the direction of the longitudinal axis, which is releasably fastened to the piston rod in its position along the longitudinal axis and is releasably fastenable in its position along the longitudinal axis of the telescopic segment independently of the position on the piston rod, is provided, then two essential base settings can be made on the telescopic seat post. Firstly, the maximum height of the seat post can be set, which is reflected in the height of the bicycle seat. This maximum height is the height which is achieved in the case of a maximally extended telescopic seat post. The second base setting is the so-called system travel of the telescopic seat post. The lowest position and also the highest position of the telescopic seat post is thereby defined. In other words, the named adjustment range of the telescopic seat post can be set. Smaller people or people with shorter leg length do not require a long system travel on a seat post. In the case of taller people, a longer system travel is required in order to be able to compensate for the longer leg length, for example. Furthermore, it is thus not necessary to produce and sell telescopic seat posts of different lengths, as a telescopic seat post with these above-named adjustment possibilities would cover all requirements of the bicycle rider. Design changes on the telescopic seat post are not needed. Through a simple setting, which the bicycle rider can even make themselves, the telescopic seat post can be adapted to the individual's requirements with respect to anatomical properties and even riding style. After these base settings (maximum height, system travel) have been set, the telescopic seat post is variably adjustable within the range of the previously made base setting, which can be effected e.g. remotely (at the push of a button from the bicycle handlebar). In other words, the base setting (maximum height of the seat, system travel of the seat) is set and then the seat post can be moved upwards and downwards individually regularly at the push of a button within the range of this previously made setting or locked in any desired intermediate positions.

If the releasable fastening of the intermediate element to the piston rod is effected via at least one blocking element, wherein the blocking element is fastened to the intermediate element or is formed at least partially by the intermediate element, then a base setting with respect to the maximum height and the system travel of the seat post can be effected via this releasable fastening of the intermediate element to the piston rod.

If the blocking element is formed at least partially annular and grips around the piston rod at least in portions and the blocking element is releasably fastenable in a friction-locking, positive-locking or force-fitting manner by a clamping action with the piston rod, then the position of the blocking element along the piston rod can be set by means of simply opening or closing the blocking element. For example, the blocking element is opened and shifted along the piston rod. For this, e.g., the blocking element can be held fast and the piston rod can be displaced along the blocking element or vice versa. After the desired position has been selected, the blocking element is closed and connects to the piston rod in a friction-locking, positive-locking or force-fitting manner.

If the releasable fastening of the intermediate element to the telescopic element is effected via at least one catch element, arranged on the intermediate element and preferably movable transverse to the longitudinal axis, which can be latched in a corresponding catch extending along the longitudinal axis inside the telescopic segment, then the position of the telescopic segment relative to the piston rod can be set. The setting of the telescopic element relative to the intermediate element is effected independently of the setting of the position of the intermediate element relative to the piston rod. In other words, the intermediate element can be fastened relative to the piston rod in a different way than the fastening between telescopic segment and intermediate element is effected. The settings can be carried out independently of each other. Due to the positive-locking connection between telescopic element and intermediate element, a stable but releasable locking of the desired position results.

If the releasable connection between intermediate element and telescopic element is effected in a positive-locking manner, a stable connection between the intermediate element and the telescopic element results. The intermediate element is releasably connected to the piston rod, the piston rod is connected to the seat tube of the bicycle. Due to this connection, a stable system results, the length of which, however, is variable.

If the telescopic segment has at least one guide element, preferably in the form of a groove, extending along the longitudinal axis, wherein at least one anti-turn device arranged on the intermediate element or formed by the intermediate element is in operative connection with the guide element and the intermediate element can be prevented from turning about the longitudinal axis, then a rotationally stable part of the intermediate element results, which is useful for the adjustment of the intermediate element relative to the telescopic segment. The catch element is mounted movably on this rotationally stable area of the intermediate element. During adjustment of the catch element the rotationally stable part of the intermediate element is thus prevented from adjusting or moving as well. The movement of the catch element relative to the rotationally stable part of the intermediate element makes it possible to latch and unlatch the catch element in the corresponding catch.

If the intermediate element has a catch device that is movable relative to the at least one anti-turn device, wherein during a movement of the catch device relative to the at least one anti-turn device the at least one catch element can be latched in or unlatched from the corresponding catch, then the movement of the at least one catch element is made possible via the adjustment of the catch device relative to the anti-turn device. This movement is effected indirectly and can be made e.g. via a mechanical connection which contacts the catch device and guides into an accessible area of the telescopic seat post. It is thus possible to carry out the base setting between the intermediate element and the telescopic segment from the outside, additionally without disassembling the telescopic seat post. The anti-turn device provides the opposing force needed to make an adjustment of the catch device possible.

If the adjustment of the position of the intermediate element along and relative to the piston rod and/or the adjustment of the position of the intermediate element along and relative to the telescopic segment can be carried out by an actuating element located in the installation position at an upper end of the telescopic element, then the adjustment of the desired base settings can be easily effected from the outside, without having to remove the telescopic seat post from the bicycle frame or even disassemble it. These adjustments can, if necessary, also be carried out in the field or during operation of the bicycle, a workshop with particular equipment or a special tool not being required therefor. For this, it is also necessary that the turning of the catch device relative to the anti-turn device can be carried out by the actuating element, wherein the actuating element is mechanically connected to the catch device. Furthermore, it may be necessary that the opening and closing of the at least one blocking element can be carried out by the actuating element, wherein the actuating element is mechanically connected to the at least one blocking element. Via these mechanical connections between blocking element and catch device and the actuating element, it is possible to carry out both base settings (maximum height of the seat post, system travel) via the actuating element. Both base settings are implemented via an actuating element. It has proved to be advantageous that the mechanical connection between the actuating element and the catch device and/or the blocking element can be produced via an adjusting tube that is adjustable about the longitudinal axis, wherein the adjusting tube extends along the longitudinal axis in the cavity of the telescopic element. Via this adjusting tube a lengthening between the catch device and/or the blocking element and the actuating element is produced. The actuating element can thus be arranged on the telescopic seat post spaced apart from the blocking element and/or the catch device. The advantage of this is that the actuating element can be arranged at an easy-to-reach point on the telescopic seat post. The adjustment of the base settings can thus be effected in a position that is comfortable for the rider and need not happen under constraint. In addition, the actuating element can be arranged at a point on the telescopic seat post which is not greatly impacted by environmental influences. In addition, via the adjusting tube, firstly, the adjustment of the intermediate element along the piston rod can be carried out indirectly, releasing the connection between blocking element and piston rod and, secondly, the adjustment of the intermediate element relative to the telescopic element can additionally also be carried out. An actuating element is thus provided for both variants of the adjustment. It is not necessary to open or disassemble the seat post in order to adjust the intermediate element relative to the piston rod, as the adjustment can be effected from the outside.

If, by a fastening member, a fastening portion of the force accumulator can be connected to the seat tube of a bicycle frame, wherein the telescopic element is connected to the piston rod of the force accumulator, wherein in the installation position of the telescopic seat post in the bicycle frame the telescopic segment protrudes from the upper end of the seat tube adjustably along a longitudinal axis, wherein in the installation position a bicycle seat is fastenable to the upper end of the telescopic segment, then a compact, telescopic seat post results, which can be constructed with few individual elements relative to the state of the art. Additional tubes which are required to guide the telescopic element are dispensed with, as a seat tube already existing on every bicycle frame is used to guide the telescopic element. The settings for position and travel of the telescopic element can be effected via only one connection element between the telescopic element and the piston rod.

The force accumulator has the task of extending the piston rod as soon as it is released for movement. This release is effected via a remote (switch) from the handlebar of the bicycle or from another convenient point on the bicycle frame. The intermediate element is here fastened to the piston rod, and at the same time is also indirectly fastened to the inner surface of the seat post. This intermediate element transmits the force of the force accumulator from the piston rod to the seat post and pushes the latter upwards to the highest position, unless latched in an intermediate position in between. This intermediate element additionally also serves to set the highest position of the seat post and in addition the system travel of the seat post can thus also be reduced. The setting of the highest position is achieved by the intermediate element being able to be fastened at different positions along the longitudinal axis of the seat post. A reduction in the system travel is achieved by the intermediate element being displaced along the longitudinal axis of the piston rod in the direction of the support element or the source of the force and fastened at the desired point. The intermediate element here serves as a stop on the support element. If the intermediate element is fastened along the piston rod closer to the support element or to the source of the force, the travel is reduced, as the intermediate element strikes it earlier. This is achieved by a maximum height of the upper end of the telescopic segment relative to the bicycle frame being producible via the actuating element and/or by the system travel between the lowest position of the upper end of the telescopic segment and the highest position of the upper end of the telescopic segment relative to the bicycle frame being producible via the actuating element.

BRIEF DESCRIPTION OF THE DRAWINGS

Further details and advantages of the present invention are explained in more detail below with reference to the drawings and to the embodiment examples represented in the drawings, in which:

FIG. 1 shows a telescopic seat post (sectional representation),

FIGS. 2-4 show an intermediate element (closed),

FIGS. 22-25 show setting variants for the travel and the set height, FIGS. 26-29 show adjustment of the travel and the set height without adjusting tube, FIGS. 30+31 show different positions of the intermediate element relative to the telescopic element

DETAILED DESCRIPTION OF THE INVENTION

Figure 5:
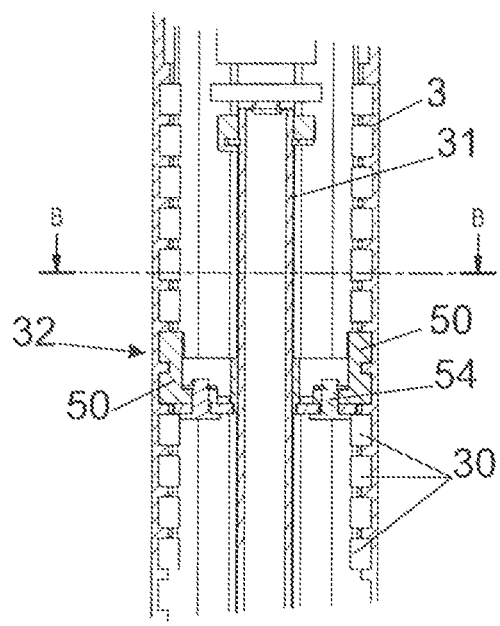
FIG. 5 shows an intermediate element in telescopic element (closed)
Figure 8:
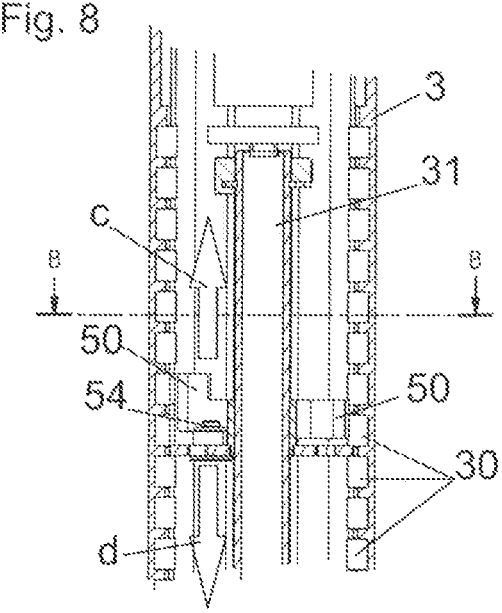
FIGS. 8+9 are different views of the intermediate element, displaceable along the telescopic element.

FIG. 1 shows a telescopic seat post 100 with an upper end OE, which is formed by the telescopic element 3. Following this, a bicycle seat, which has been omitted for simplification of the drawing, is fastened to the upper end OE. Inside the telescopic element 3 a cavity runs along its longitudinal axis LA. The piston rod 31 of the force accumulator 69 runs along the longitudinal axis LA in this cavity. The force accumulator 69 is connected to the seat tube SR of the bicycle FR by a fastening member 70 on its fastening portion BA (see FIG. 32). If the piston rod 31 of the force accumulator 69 is retracted or extended, the position of the telescopic element 3 is adjusted relative to the seat tube SR. This adjustment on the force accumulator 69 is effected by a remote (switch) at a suitable place on the bicycle FR— preferably on the handlebar. The remote (switch) is connected to the seat post 100 via a Bowden cable or another means for transmitting force or also via a radio connection. The locking of the position, which can be preselected via the remote, is effected via the opening and closing of the catch on the guide element 37. The opening and closing of the catch on the guide element 37 along the telescopic element 3, however, only passively concerns the base setting of the telescopic seat post 100. The adjustment of the telescopic element 3 via the remote to lower and raise the telescopic seat post 100 during operation of the bicycle FR is state of the art. The intermediate element 32 is releasably fastenable to the piston rod 31 and is releasably fastenable in its position along the longitudinal axis LA of the telescopic segment 3 independently of the fastening position on the piston rod 31. The base setting can be effected via the actuating element 63. However, it is also conceivable that only one of the settings (maximum height or system travel) can be set via the actuating element 63. For further settings, it can be the case that e.g. the telescopic element 3 must be moved relative to the piston rod 31 into a position in order to be able to access the intermediate element 32 from the outside. The intermediate element 32 is releasably fastened to the piston rod 31. This connection can be implemented in a friction-locking, positive-locking or force-fitting manner. In this way, the travel of the piston rod 31 relative to the seat tube SR can be set. If the intermediate element 32 is placed closer to the guide element 37, the system travel Hsys reduces, as it thus strikes it earlier. If the intermediate element 32 is placed at a distance from the guide element 37, the system travel Hsys increases, as the intermediate element 32 only strikes the guide element 37 after a greater distance along the longitudinal axis LA. The intermediate element 32 also serves to set the highest position of the telescopic element 3. This happens as a result of a displacement and subsequent fastening of the intermediate element 32 relative to the telescopic element 3. The intermediate element 32 can be fastened in a friction-locking or positive-locking manner at different positions along the longitudinal axis LA of the telescopic element 3.

FIG. 2 and FIG. 3 show the intermediate element 32, consisting of a spring-loaded catch element 58 and the blocking element 52. In this case the blocking element 52 can be connected to the piston rod 31 in a friction-locking manner. By loosening the screw 55 the friction-locking connection between the intermediate element 32 and the piston rod 31 is released, wherein the intermediate element 32 can be displaced along the longitudinal axis LA on the piston rod 31. At two points the intermediate element 32 has vertical anti-turn devices 51, which engage in a guide element 98, preferably in the form of a groove, in the telescopic element 3, as can be seen in FIG. 4. This groove extends along the longitudinal axis LA of the telescopic segment 3. The telescopic segment 3 is not visible in FIGS. 2 and 3. Through a rotation of the piston rod 31 about the longitudinal axis LA with the aid of the actuating element 63, the at least one catch element 50 is set in motion. This is effected via the connection of the catch elements 50 to the catch device 58, which is in operative connection with the piston rod 31. One part of the intermediate element 32 is connected to the telescopic segment 3 in a rotationally stable manner via the anti-turn device 51—this is effected because of the guide element 98. Another part of the intermediate element 32 is designed not rotationally stable and turns when the piston rod 31 is turned about the longitudinal axis LA. Via the catch device 58, which is connected to the catch elements 50, the position of the at least one catch element 50 is altered. The alteration is effected radially in the direction of the piston rod 31. The external diameter of the intermediate element 32 thus alters because of the change in position of the at least one catch element 50. The at least one catch element 50 engages in the catches 30 located along the longitudinal axis LA. If the position of the at least one catch element 50 is changed, the engagement in the catches 30 is prevented and the intermediate element 32 can be displaced along the telescopic element 3 in the direction of the longitudinal axis LA. The at least one catch element 50 is connected to the anti-turn device 51 via control bolts 54. The anti-turn device 51 has control guides, which bring about a change in position of the catch elements 50 when the catch device 58 is moved relative to the intermediate element 32. When the piston rod 31 is turned, the control bolts 54 move along the control guides, which leads to a reduction in the external diameter of the intermediate element 32. The distance between the catch elements 50 reduces here, moreover the catch elements 50 are additionally rotated out of the catches 30. FIG. 5 shows, in a sectional representation, how the intermediate element 32 takes hold in the telescopic element 3 in a positive-locking manner. The movement of the intermediate element 32 along the longitudinal axis LA of the telescopic element 3 has thus been prevented.

FIGS. 1 to 5 show how the position of the piston rod 31 is blocked relative to the telescopic element 3.

Figure 6:
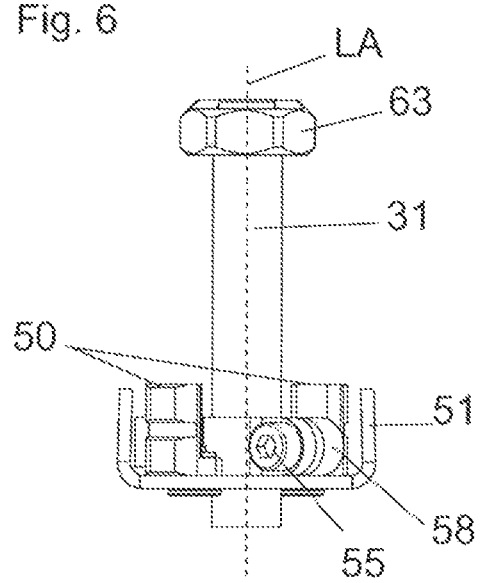
FIGS. 6+7 are different views of the intermediate element (opened)
Figure 7:
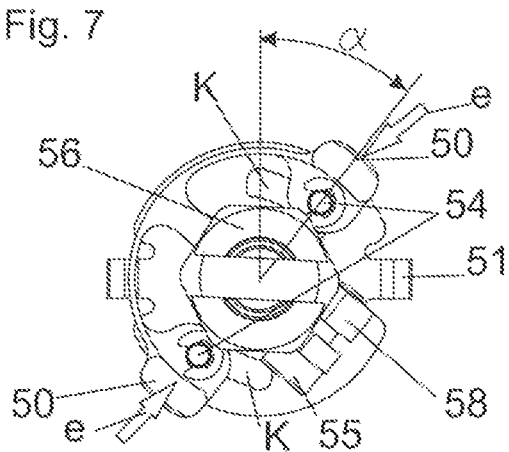

FIG. 6 shows a turned catch device 58 relative to the anti-turn device 51. The turning is effected at an angle $\alpha$, as can be seen in FIG. 7. The turning is effected via the actuating element 63, which is connected to the piston rod 31 in a rotationally fixed manner. By turning the actuating element 63 and thus the piston rod 31 the catch device 58 is set in motion and the at least one catch element 50 alters its position. The arrows e in FIG. 7 indicate the movement of the catch elements 50. When the catch device 58 is turned relative to the anti-turn device 51 by the angle $\alpha$, the distance between the catch elements 50 reduces and the intermediate element 32 is displaceable along the telescopic element 3 in the direction of the longitudinal axis LA.

Figure 9:
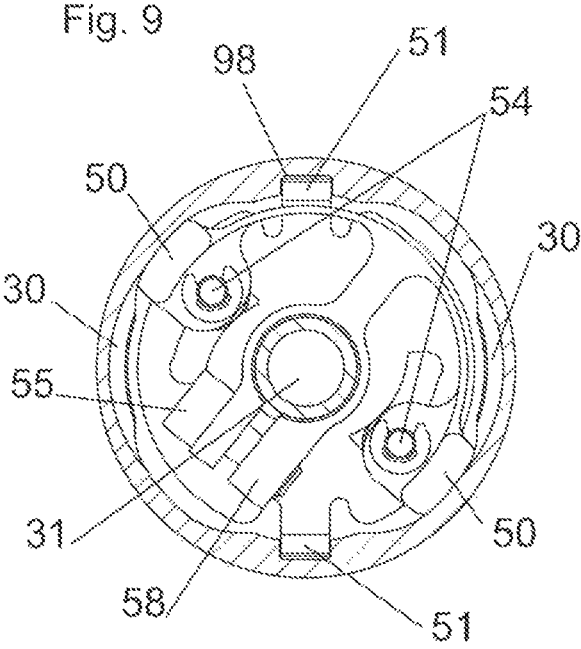

FIG. 9 shows how the anti-turn devices 51 are located in the longitudinal groove, the guide element 98, of the telescopic element 3. The at least one catch element 50 no longer engages in the catch 30, which is necessary for the longitudinal displaceability in the telescopic element 3. The angle $\alpha$ here is approx. 45°. The turning can be effected clockwise and/or anti-clockwise. The turning by the angle $\alpha$ causes the catch elements 50 to come together and thus the positive-locking join between intermediate element 32 and telescopic element 3 to be released.

Figure 10:
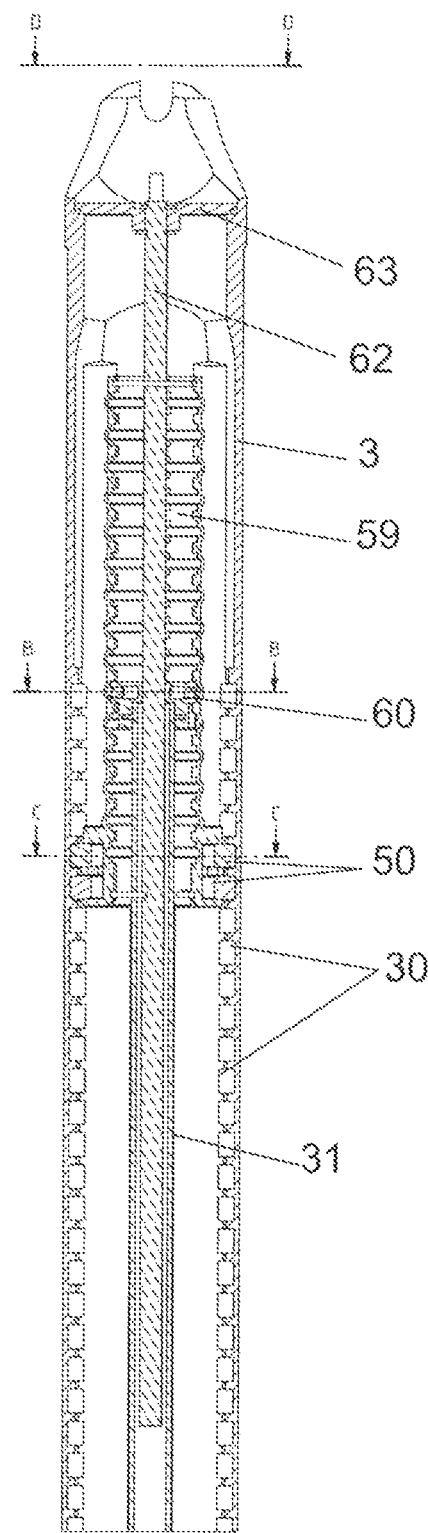
FIGS. 10-13 show a telescopic seat post with adjusting tube (closed state)
Figure 11:
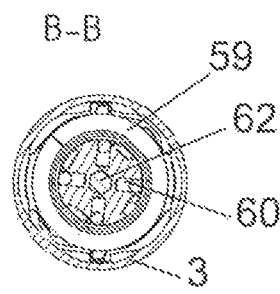
Figure 12:
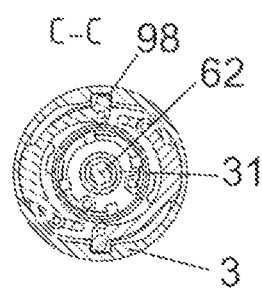
Figure 13:
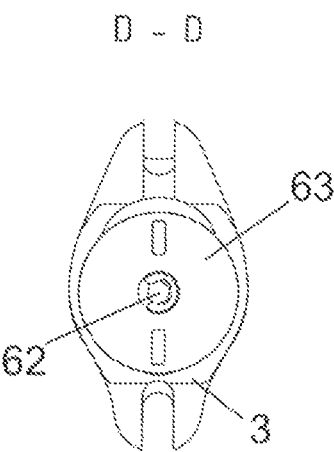
Figure 32:
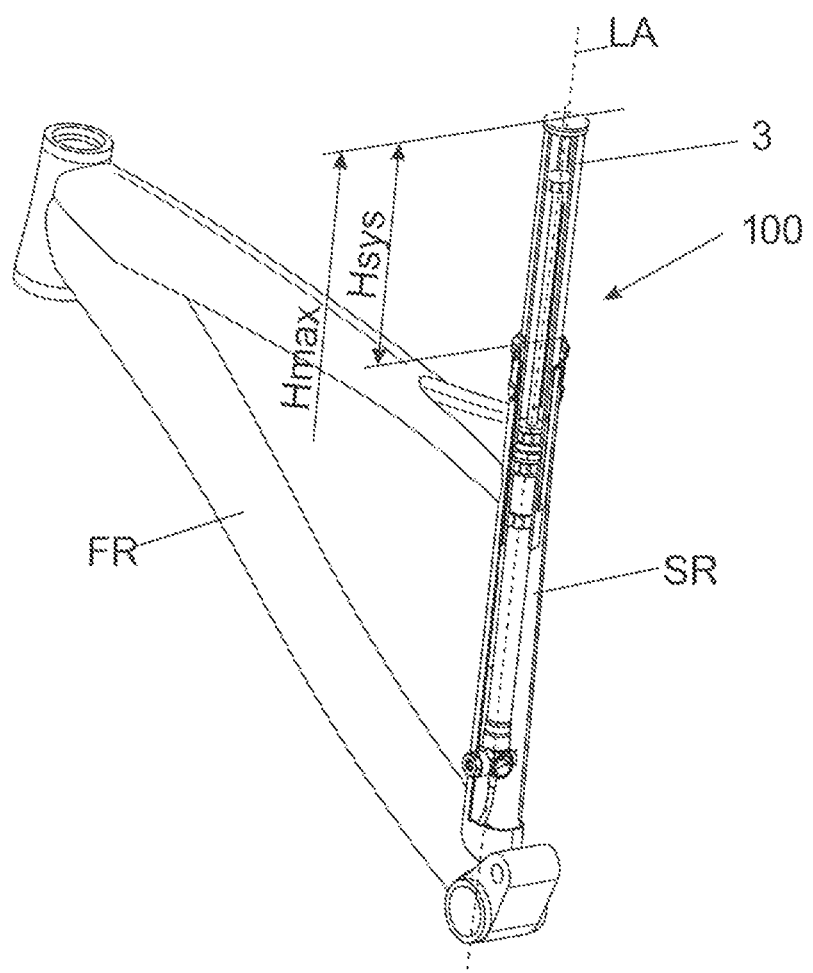
FIG. 32 shows a telescopic seat post on a bicycle.

FIG. 10 shows another variant of the adjustment of the system travel Hsys and the maximum height Hmax of the telescopic element 3 relative to the bicycle frame FR (see also FIG. 32). It consists of the telescopic element 3, an adjusting tube 59, a rotational element 60, an adjusting shaft 62, an actuating element 63 and the at least one catch element 50. The adjusting tube 59 is connected to the telescopic element 3 in a positive-locking manner via the catch elements 50. At the same time the piston rod 31 in the adjusting tube 59 is connected to the adjusting tube 59 in a positive-locking manner via the rotational element 60. The underside of the adjusting tube 59 serves as a stop, which strikes the guide element 37 (represented in FIG. 1) in the lowest position. The setting of the maximum height Hmax of the telescopic element 3 is effected via an unlatching of the catch elements 50 by rotating the adjusting tube 59 about the longitudinal axis LA, in this case anti-clockwise. The rotational force acts, via the adjusting shaft 62 in connection with the actuating element 63, on the rotational element 60 and, after that, on the intermediate tube 59, which is also rotated. The rotational force, in other words, is transmitted to the rotational element 60 and to the intermediate tube 59 before the actuating element 63. Through this rotation the catch elements 50 are moved radially inwards, thus they extend out of the catches 30 and the positive-locking connection between the catch elements 50 and the telescopic element 3 is released, in order to be able to make a height adjustment. FIG. 10 has three sections. Section B-B is shown in FIG. 11, section C-C is shown in FIG. 12 and section D-D in FIG. 13. FIG. 11 shows the rotationally stable connection between the adjusting shaft 62 and the rotational element 60. FIG. 12 shows how a part of the intermediate element 32 engages, via guide elements 98, in the guide of the telescopic element 3 and thus is mounted in a rotationally stable manner. FIG. 13 shows the actuating element 63, which is connected to the adjusting shaft 62 in a rotationally stable manner. The actuating element 63 is located at the upper end OE of the seat post 100.

Figure 14:
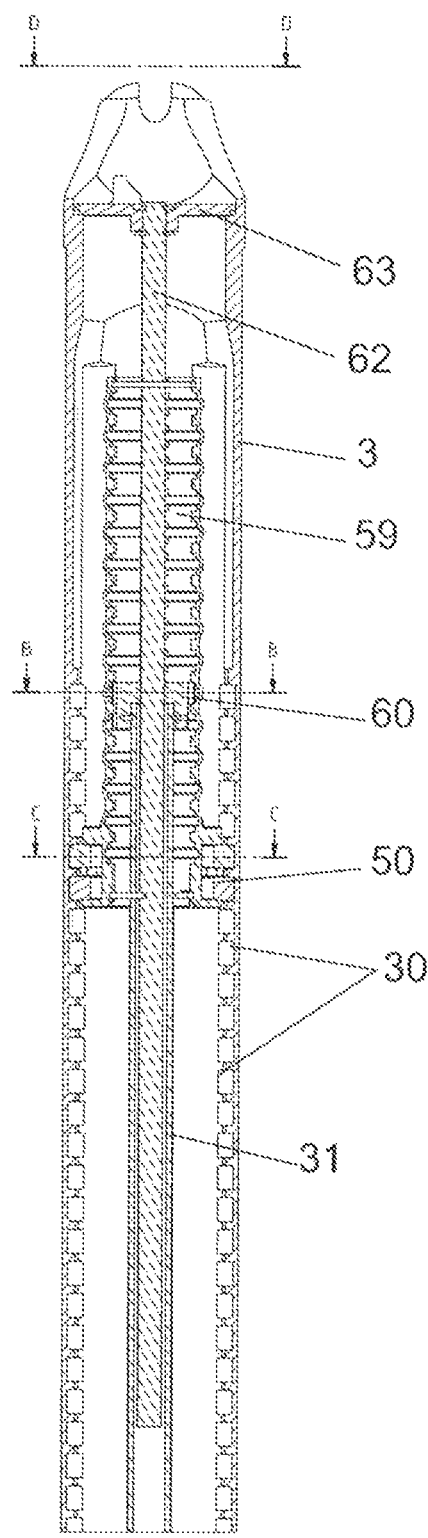
FIGS. 14-17 show a telescopic seat post with adjusting tube (piston rod adjustment)

FIG. 14 to FIG. 17 show the unlatched state of the rotational element 60. Through a rotation on the actuating element 63—in this case anti-clockwise—via the adjusting shaft 62 the rotational element 60 associated therewith is turned, which releases the positive-locking connections between the intermediate tube 59 and the rotational element 60. In this state the rotational element 60 can be displaced along the longitudinal axis LA together with the piston rod 31 and fixed again at different points along the intermediate tube 59 by turning the actuating element 63 back—in this case clockwise. Through this adjustment of the latched position of the rotational element 60 with the piston rod 31 a possible reduction in the system travel Hsys of the piston rod 31 and thus also of the telescopic element 3 is achieved. A higher latched position of the rotational element 60 in the intermediate tube 59 brings about an earlier striking of the intermediate tube 59 on the guide element 37. FIG. 14 has sections B-B, C-C and D-D.

Figure 15:
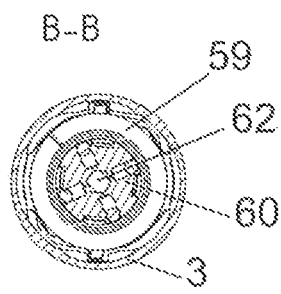
Figure 16:
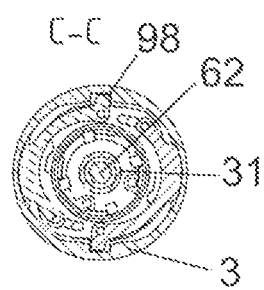

FIG. 15 shows section B-B, wherein the rotational element 60 has been adjusted relative to the telescopic element 3. The height of the rotational element 60 can thus be adjusted along the intermediate tube 59. The intermediate tube 59 itself, however, is still connected to the telescopic element 3 in a positive-locking manner by the catches 30 in the telescopic element 3. Thus, only the position of the rotational element 60 relative to the piston rod 31 can be adjusted.

Figure 17:
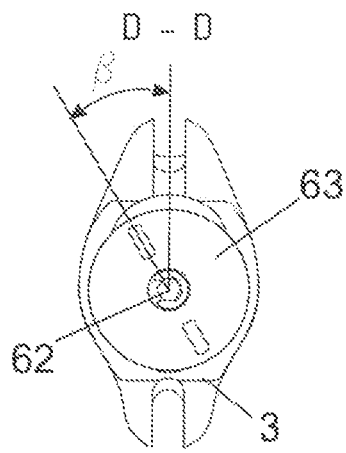

FIG. 17 shows the actuating element 63, as it has been adjusted at angle $\beta$. The angle $\beta$ is thus responsible for the adjustment of the rotational element 60 relative to the piston rod 31 and thus for the system travel Hsys of the telescopic seat post 100.

FIG. 18 to FIG. 21 describe the unlatched state between the intermediate tube 59 and the telescopic element 3. Through a rotation of the actuating element 63—in this case anti-clockwise—at an angle $\beta$ via the adjusting shaft 62 the connected rotational element 60 is rotated and the positive-locking connection between the intermediate tube 59 and the rotational element 60 is loosened. If the actuating element 63, however, is further rotated beyond the angle $\beta$—in this case anti-clockwise—at an angle $\gamma$, then the intermediate tube 59 also rotates further in the same direction. This has the effect that the catch elements 50 move towards each other radially and withdraw from the catches 30. The positive-locking connection between the telescopic element 3 and the intermediate tube 59 is thus loosened. In this way, the telescopic element 3 can then be displaced along the longitudinal axis LA and is thus height-adjustable—the setting of the maximum height Hmax is effected. By turning the actuating element 63 back clockwise, the catch elements 61 latch again. The position is thus locked at the desired maximum height Hmax.

Figure 18:
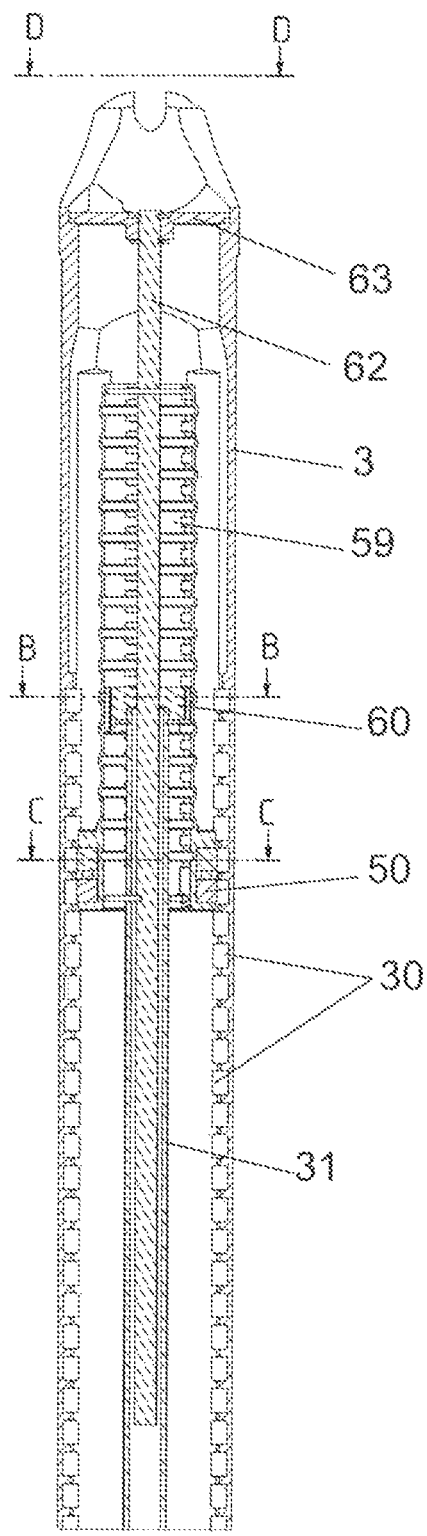
FIGS. 18-21 show a telescopic seat post with adjusting tube (telescopic element adjustment)
Figure 19:
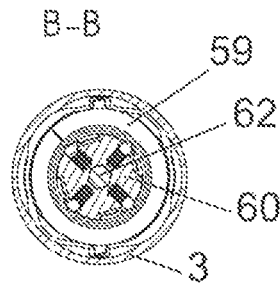
Figure 20:
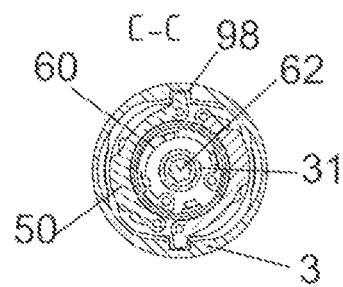
Figure 21:
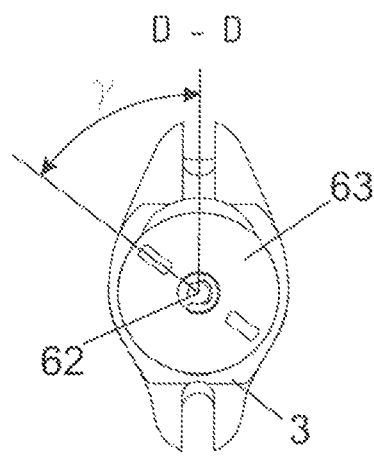

FIG. 18 is divided into three sections—section B-B is represented in FIG. 19, this shows how a connection between the catches 30 and the intermediate tube 59 is no longer produced. This is shown in detail in section C-C of FIG. 20. A constriction of the catch elements 50 is achieved by the guide elements 98 and the turning of the rotational element 60. The positive-locking join to the telescopic tube 3 is thus released along the longitudinal axis LA. Section D-D of FIG. 21 shows the angle $\gamma$ on the actuating element 63, which is connected to the adjusting shaft 62 in a rotationally fixed manner.

FIG. 22 to FIG. 25 describe the different setting variants of the maximum height Hmax and the system travel Hsys of the telescopic element 3 in conjunction with the adjusting tube 59 as an adjusting unit. The adjusting tube 59 can be adjusted relative to the piston rod 31 and to the telescopic element 3 in both directions and thus serves to limit the system travel Hsys and to set the end position, the height Hmax, of the telescopic element 3. L21 is the total length of the system from the fastening portion BA of the force accumulator 69 to the upper end OE of the telescopic element 3. The length L21 can vary upwards and downwards, if it has to be adapted to the body size of the rider. When the telescopic seat post 100 is lowered during riding, the length L11 reduces down to zero, when the adjusting tube 59 sits on the guide element 37. The length L11 describes the distance between the guide element 37 and the adjusting tube 59. L11 is the effective travel Hsys, which the telescopic element 3 can travel downwards when the telescopic seat post 100 is lowered. The travel Hsys and thus the length L11 can be reduced by latching the piston rod 31 to the rotational element 60 at a higher position in the adjusting tube 59. A reduction in travel also reduces the distance L1.

The setting of the highest position or maximum height Hmax of the telescopic element 3 is effected via an alteration of the position of the adjusting tube 59 in the telescopic element 3 along the longitudinal axis LA. The higher the telescopic element 3 is to be positioned in the extended state, the greater the distance L2 also is. This means that the adjusting tube 59 is locked in place further down in the telescopic element 3.

FIG. 22 to FIG. 25 show different positions and setting possibilities. The positions of FIG. 22 and FIG. 23 show the locking-in-place of the adjusting tube 59 in the highest position in the telescopic element 3. The length L2 has achieved the minimum value and the telescopic element 3 can no longer be brought down to a lower height Hmax by a positional displacement of the adjusting tube 59 in order to reduce the length L1. This means that the telescopic element 3 could only be brought down to a lower height Hmax by a reduction in the travel L11 in order to reduce the length L1. FIG. 24 and FIG. 25 show the locking-in-place of the adjusting tube 59 at a lower height Hmax in the telescopic element 3. This means that the telescopic element 3 has been brought to a higher height Hmax. The lengths L2 and L1 have been increased to the same extent. In addition, FIG. 23 and FIG. 25 show settings in which the travel Hsys has been reduced. In other words, the piston rod 31 has been locked in place inside the adjusting tube 59 at a higher height Hmax. The distance L11 here has been reduced. In order to be able to achieve the higher end position again in the case of this reduced travel Hsys, the adjusting tube 59 must be locked in place further down in the telescopic element 3, which in turn increases the distance L2.

FIG. 26 to FIG. 29 describe the different setting variants of the system travel Hsys and the set height Hmax of the telescopic element 3 in conjunction with the intermediate element 32 as an adjusting unit. The intermediate element 32 can be adjusted relative to the piston rod 31 and to the telescopic element 3 in both directions of the longitudinal axis LA and thus serves to limit the system travel Hsys and to set the end position or maximum height Hmax of the telescopic element 3. L21 is the total length of the system from the fastening portion BA for fastening in the seat tube SR of a bicycle frame FR to the upper end OE of the telescopic element 3. The length L21 can vary upwards and downwards, if it has to be adapted to the body size of a rider. When the telescopic seat post 100 is lowered during riding, the length L11 reduces down to zero, when the intermediate element 32 sits on the guide element 37. The length L11 describes the distance between the guide element 37 and the connection element 32. L11 is the effective travel Hsys, which the telescopic element 3 can travel downwards if the telescopic seat post 100 is to be lowered. The travel Hsys and thus the length L11 can be reduced by positioning the intermediate element 32 at a lower position along the longitudinal axis LA on the piston rod 31. The intermediate element 32 then strikes the guide element 37 after a shorter distance along the longitudinal axis LA.

The setting of the highest position of the telescopic element or the height Hmax is effected via an alteration of the position of the intermediate element 32 along the longitudinal axis LA in the telescopic element 3. The higher the telescopic element 3 is to be positioned in the extended state, the greater the distance L2 is also chosen to be. This means that the intermediate element 32 is locked in place further down in the telescopic element 3.

FIG. 26 and FIG. 27 show the locking-in-place of the intermediate element 32 in a lower locking position or height Hmax in the telescopic element 3. This means that the seat post 100 has been brought into a higher highest height Hmax. The lengths L2 and L1 have been increased to the same extent.

FIG. 28 and FIG. 29 show the locking-in-place of the intermediate element 32 at the highest height Hmax in the telescopic element 3. In this case L2 has achieved the minimum value and the telescopic element 3 can here no longer be brought down to a lower height Hmax by an alteration of the position of the intermediate element 32 in order to be able to reduce the length L1. This means that the telescopic seat post 100 at this point can be brought down to a lower height Hmax only by a reduction in the system travel L11 in order to reduce the distance L1.

FIG. 26 and FIG. 28 show settings in which the system travel Hsys has been reduced. This means that the intermediate element 32 has been positioned further down along the longitudinal axis LA on the piston rod 31. The distances from the upper stop element 56 on the piston rod 31 and from the intermediate element 32 (length L12) have been increased. This brings about a reduction in the length L11 and thus a shorter system travel Hsys for lowering the telescopic seat post 100. In order to be able to achieve a higher end position again in the case of this reduced system travel Hsys, the intermediate element 32 would have to be locked in place further down in the telescopic element 3, which would increase the distance L2.

FIG. 27 and FIG. 29 show the intermediate element 32 in the highest position in the stop element 56. The length L12 here is minimal and the length L11 is maximal. In this setting the complete system travel Hsys of the telescopic seat post 100 can be utilized.

Figure 30:
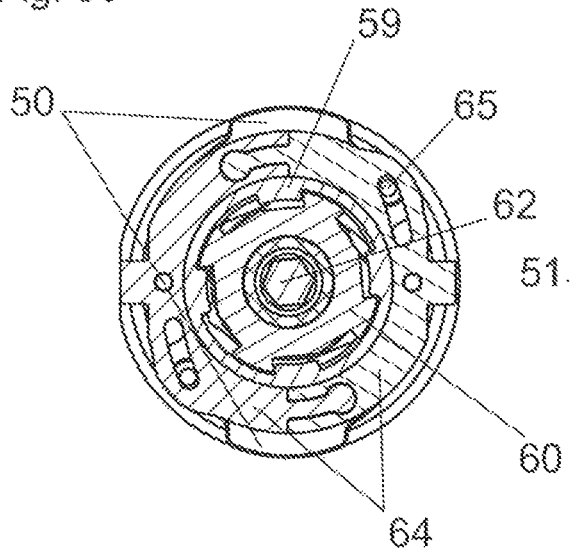
Figure 31:
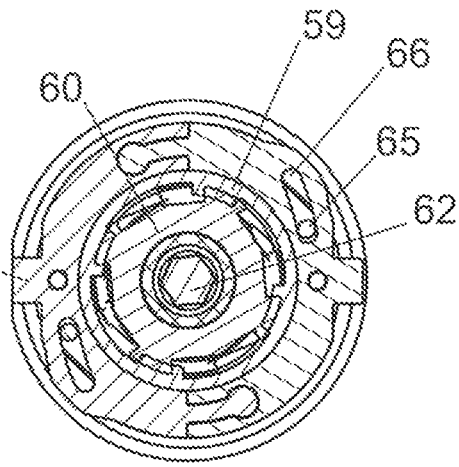

FIG. 30 shows the adjusting shaft 62, the rotational element 60 and the operative connection to the adjusting tube 59. The adjusting tube 59 acts on the expandable control plates 64, which leads to a movement of the catch elements 50 relative to each other. In addition, it is achieved that a connection between the rotational element 60 and the adjusting tube 59 is designed releasable and fastenable. When the rotational element 60 is turned by a certain angle, the catch elements 50 are thus moved and the connections between adjusting tube 59 and rotational element 60 are also released. The raised state is shown in FIG. 31. The catch elements 50 have been withdrawn due to the turning of the adjusting shaft 62 and thus also due to the turning of the rotational element 60. In addition, the rotational element 60 is movable along the longitudinal axis LA relative to the adjusting tube 59 and to the piston rod 31. The adjustment of the maximum height Hmax and of the system travel Hsys can thus be effected.

FIG. 32 shows a telescopic seat post 100 in a bicycle frame of a bicycle FR. Attachments, such as e.g. wheels, cranks and handlebars, have been omitted here for simplification of the drawing. The seat post 100 is variably adjustable along the longitudinal axis LA. The height Hmax and the system travel Hsys are defined and can be set as base set values.

The invention claimed is:

1. A telescopic seat post comprising:
a tubular telescopic element having a longitudinal axis and a cavity extending along the longitudinal axis;
a piston rod extending along the longitudinal axis in the cavity of the telescopic element;
a force accumulator connected to the piston rod for moving the piston rod in the direction of the longitudinal axis; and
an intermediate element displaceable along the piston rod and along the telescopic element in the direction of the longitudinal axis, the intermediate element being releasably fastenable to the piston rod in different positions along the longitudinal axis and being releasably fastenable in different positions along the longitudinal axis of the telescopic element independently of a position on the piston rod.

2. The telescopic seat post according to claim 1, further comprising a blocking element configured to perform the releasable fastening of the intermediate element to the piston rod, wherein the blocking element is fastened to the intermediate element or is formed at least partially by the intermediate element.

3. The telescopic seat post according to claim 2, wherein the blocking element is at least partially annular and grips around the piston rod, and the blocking element is releasably fastenable in a friction-locking, positive-locking or force-fitting manner by a clamping action with the piston rod.

4. The telescopic seat post according to claim 2, further comprising an actuating element configured to perform adjustment of the position of the intermediate element along and relative to the piston rod and/or the adjustment of the position of the intermediate element along and relative to the telescopic element, the actuating element being located at an upper end of the telescopic element.

5. The telescopic seat post according to claim 4, further wherein the actuating element is configured to perform opening and closing of the blocking element, wherein the actuating element is mechanically connected to the blocking element.

6. The telescopic seat post according to claim 1, wherein the releasable fastening of the intermediate element to the telescopic element is effected via a catch element arranged on the intermediate element, the catch element being configured to be latched in a corresponding catch extending along the longitudinal axis inside the telescopic element.

7. The telescopic seat post according to claim 6, wherein the catch element is movable transverse to the longitudinal axis.

8. The telescopic seat post according to claim 1, wherein the releasable connection between intermediate element and telescopic element is effected in a positive-locking manner.

9. The telescopic seat post according to claim 1, wherein the telescopic element has a guide element extending along the longitudinal axis, an anti-turn device being arranged on the intermediate element or formed by the intermediate element is operatively connected to the guide element to prevent the intermediate element from turning about the longitudinal axis.

10. The telescopic seat post according to claim 9, wherein the intermediate element has a catch device movable relative to the anti-turn device, wherein the catch element is configured to be latched in or unlatched from the corresponding catch during a movement of the catch device relative to the anti-turn device.

11. The telescopic seat post according to claim 10, further comprising an actuating element configured to perform turning of the catch device relative to the anti-turn device, wherein the actuating element is mechanically connected to the catch device.

12. The telescopic seat post according claim 11, further comprising a blocking element configured to perform the releasable fastening of the intermediate element to the piston rod, and an adjusting tube forming the mechanical connection between the actuating element and the catch device and/or the blocking element, the adjusting tube being rotatable about the longitudinal axis, the adjusting tube extending along the longitudinal axis of the piston rod and extending along the longitudinal axis of the telescopic element in the cavity of the telescopic element.

13. The telescopic seat post according to claim 9, wherein the guide element is a groove.

14. The telescopic seat post according to claim 1, further comprising a fastening member for connecting a fastening portion of the force accumulator to the seat tube of a bicycle frame, the telescopic element being connected to the piston rod of the force accumulator, the telescopic element protruding from an upper end of the seat tube adjustably along a longitudinal axis, the telescopic element being configured to have a bicycle seat fastened to an upper end of the telescopic element.

15. The telescopic seat post according to claim 14, further comprising an actuating element configured to perform at least one of: (i) effecting a maximum height of the upper end of the telescopic element relative to a bicycle frame; and (ii) effecting system travel between a lowest position of the upper end of the telescopic element and a highest position of the upper end of the telescopic element relative to the bicycle frame.

16. A bicycle comprising the telescopic seat post according to claim 1.

* * * * *